3,773,760
Patented Nov. 20, 1973

3,773,760
2-AMINOPYRIMIDINE ETHYLMERCURITHIO-SALICYLATE

Charles Pilet, 8 Avenue du Buisson, Parc Saint-Maur, France, and Dominique Bocher, 11 Rue du Moulin Vert, Paris, France
No Drawing. Filed May 4, 1972, Ser. No. 250,247
Claims priority, application France, May 6, 1971, 16,414
Int. Cl. C07d 51/42
U.S. Cl. 260—242            3 Claims

ABSTRACT OF THE DISCLOSURE 2-aminopyrimidine ethylmercurithiosalicylate is prepared by reacting ethylmercurithiosalocylic acid with 2-aminopyrimidine under reflux. The resulting salt is effectively used in pharmaceutical compositions comprising a pharmaceutically acceptable excipient and said salt present in amounts of 1/1000–1/100,000 by weight of said composition.

---

The present invention relates to 2-aminopyrimidine ethylmercurithiosalicylate and to its use as a bacteriostatic, bactericidal and fungicidal agent.

The present invention also relates to a process for preparing a very good antiseptic agent exhibiting good bacteriostatic, bactericidal and fungicidal properties, said agent consisting essentially of the 2-aminopyrimidine salt of ethylmercurithiosalicylic acid.

2-aminopyrimidine ethylmercurithiosalicylate having the empirical formula $C_{13}H_{15}N_3O_2S$ Hg, can be represented by the following formula:

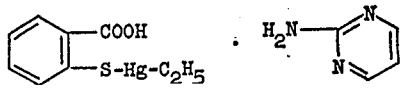

Its molecular weight is 477.5 and its composition in percentages is as follows: C—32.67%; H—3.14%; N—8.79%; O—6.70%; S—6.70%; Hg—41.98%.

This compound has the form of a creamy white powder with a very weak characteristic odor.

Its instantaneous melting point (Maquenne block) is 91° C.±1°.

The solubility of 2-aminopyrimidine ethylmercurithiosalicylate in various solutions is as follows (expressed in weight): 4.5% in chloroform, 1.5% in ethanol, 1% in alkaline water, 1% in methanol, 1% in ethyl acetate, 0.5% in benzene and 0.4% in ether.

The present invention also relates to a process for the preparation of 2-aminopyrimidine ethylmercurithiosalicylate, according to which process ethylmercurithiosalicylic acid is converted to a salt of 2-aminopyrimidine by reflux heating of an ethanol solution of ethylmercurithiosalicylic acid with a slight molar excess of 2-aminopyrimidine. Ethylmercurithiosalicylic acid is a commercial product.

On cooling, the 2-aminopyrimidine ethylmercurithiosalicylate is crystallized, whereupon it is dried and then recrystallized to purify it, thus yielding the product in the form of colorless microcrystals. Further, this process makes it possible to obtain 2-aminopyrimidine ethylmercurithiosalicylate in good yield.

The purity of the product can be determined by means of the following procedure:

In a 100 cc. capacity conical vessel, there was weighed very exactly a sample $p$ close to 0.5 g. 2-aminopyrimidine ethylmercurithiosalicylate to which there were added 5 cc. concentrated sulfuric acid. The resulting mixture was gently heated to carbonizing. This heating was continued and, drop by drop, a hydrogen peroxide solution was added until the solution was practically colorless. Thereafter, this solution was diluted with about 50 cc. water, cooled and titered by means of a 0.1 N solution of ammonium thiocyanate in the presence of ferric sulfate and ammonium as an indicator.

If $n$ is the number of cubic centimeters of 0.1 N solution of thiocyanate (1 cc. of 0.1 N solution of ammonium thiocyanate corresponds to 0.02387 g. 2-aminopyrimidine ethylmercurithiosalicylate) the percentage product content is thus $n \times 2.387$, which, according to tests conducted herein, gives a content of the order of 99% ±1 on the dry product.

In all preparation tests run in accordance with the present invention, the total amount of nitrogen was always between 8.20 and 9.20% on the dry product, the theoretical being 8.79%.

The present invention also relates to a pharmaceutical composition containing 2-aminopyrimidine ethylmercurithiosalicylate in a suitable pharmaceutical vehicle.

These compositions, according to the invention, generally contain from 1/1000 to 1/100,000, preferably from 1/1000 to 1/5000 2-aminopyrimidine ethylmercurithiosalicylate. These compositions in accordance with this invention can be in various forms such as a liquid, paste, cream, ovules, tablets and the like.

In another embodiment of the present invention, 2-aminopyrimidine ethylmercurithiosalicylate can be used as a preservative for serum and vaccine or as a preservative for biological media.

In this embodiment, the 2-aminopyrimidine ethylmercurithiosalicylate can be present in a concentration of the order of 1/10,000.

In yet another embodiment of the present invention, 2-aminopyrimidine ethylmercurithiosalicylate solutions having a concentration of 1/1000 to 1/5000 of said salt can be used for sterilizing instruments and prosthesis material.

The different pharmacological actions of 2-aminopyrimidine ethylmercurithiosalicylate have been demonstrated by laboratory experiments on various microbe strains which can be summarized as follows:

(1) Bacteriostatic action: the minimal inhibiting concentration of the product ranges from 1 to 0.1 microgram on most gram positive and gram negative bacteria.

(2) Bactericidal action: bactericidal power after 24 hours ranges between 100 gamma and 15 gamma depending upon the bacteria.

(3) Fungicidal action: activity to 1 gamma on *Aspergillus niger*, *Microsporon andelini* and *Geotrichum candidum*.

The toxicological effect ($DL_{50}$) on mouse was shown to be as follows:

|  | Mg./kg. |
|---|---|
| Per os | 190 |
| Intravenous | 120 |

2-aminopyrimidine ethylmercurithiosalicylate was shown to be less poisonous than sodium ethylmercurithiosalicylate.

Tolerance to 2-aminopyrimidine ethylmercurithiosalicylate was studied in rats. In daily application, except Sunday, for one month on a shaved part of the skin at a concentration of 1:1000 or 1:5000, there was no toxic phenomenon of any kind, nor loss of weight, nor hematological change.

2-aminopyrimidine ethylmercurithiosalicylate is thus useful, because of its properties, as (1) an antiseptic or contact antifungal therapeutic preparation for disinfecting wounds, burns, skin, mucosa, ulcers, bedsores, furuncles, operatory fields, and for treatment of mycoses and epidermal mycoses of any origin;

(2) in the inactivation and conservation or preservation of vaccines and sera;

(3) in the conservation or preservation of biological media;

(4) in the sterilization of instruments and prosthesis material; and (5) in the disinfecting of rooms, apparatus and air.

The activity of 2-aminopyrimidine ethylmercurithiosalicylate has also been confirmed by clinical experiments on man, especially concerning bacteriostatic, bactericidal and fungicidal effect. These experiments yielded satisfactory results.

By way of illustration, there are presented examples of preparation and use of 2-aminopyrimidine ethylmercurithiosalicylate.

PREPARATION OF 2-AMINOPYRIMIDINE ETHYLMERCURITHIOSALICYLATE

Example 1

Into a 3 liter vessel provided with coolant, there were placed 282.5 g. (1 mole) ethylmercurithiosalicylic acid (commercial product), 1 liter ethanol and 105 g. (1.10 mole) 2-aminopyrimidine previously dissolved hot in 500 cc. ethanol.

The mixture was then placed in reflux with ethanol for 2 hours after which the 700 cc. ethanol was driven off under vacuum.

After concentration, the 2-aminopyrimidine ethylmercurithiosalicylate was allowed to crystallize by cooling and the precipitate was dried, and recrystallized in ethanol.

The product was obtained with a yield of 89.5%, in the form of colorless microcrystals.

With recrystallization in ethanol, the melting point was 90–91° C.

USE OF THE COMPOUND OF THE PRESENT INVENTION

Example 2

A composition according to the present invention was obtained by introducing 0.1 g. 2-aminopyrimidine ethylmercurithiosalicylate in to 100 ml. of a conventional liquid pharmaceutical excipient.

In a modification, 18 g. 10% lauryl sulfate were added.

This liquid composition can be used as general antiseptic for treatment of wounds, abrasions, ulcers, and for deodorizing infected wounds. It can also be used in surgery for the preparation of the area of the operation and for disinfecting of contaminated wounds.

It can also be used in gynecology for disinfecting the perineal region in preparation for delivery. Additionally, it can be used in dermatology for treatment of acne, impetigo or mycoses.

Example 3

A gynecological cream was prepared by admixing 0.1 g. 2-aminopyrimidine ethylmercurithiosalicylate and 2 g. of 10% lauryl sulfate in 100 g. of a conventional absorbable creamy excipient. This cream can be used to treat bacterial, mycotic or trichotoma vaginitis and it can also be used to treat furunculoses.

Example 4

0.1 g. of 2-aminopyrimidine ethylmercurithiosalicylate and 0.05 g. lauryl sulfate were preserved as an ovule with conventional pharmaceutical excipient, these amounts being for one ovule.

The ovules can be used for treatment of leucorrhea, bacterial vaginitis as well as vaginal mycoses or trichotomas.

Example 5

A collyrium was prepared according to the invention by admixing 0.001 g. of 2-aminopyrimidine ethylmercurithiosalicylate with 100 ml. of a conventional collyrium excipient.

This composition can be used for the treatment of wounds of the eyelids and for conjunctivitis.

Example 6

A composition is prepared in the form of a spray by introducing 0.001 g. of 2-aminopyrimidine ethylmercurithiosalicylate and 0.2 g. hydrocortisone in 100 ml. of a conventional sprayable liquid pharmaceutical excipient.

The solution thus obtained is packaged as a mechanically sprayable product, as an aerosol sprayable product in a conventional aerosol dispenser under pressure, together with a conventional aerosol propellant such as a Freon, including Freon 11, 12, 114 and mixtures thereof.

This composition can be used for disinfecting the nasal passages and for rhinitis.

Example 7

A bacterial suspension, e.g. staphylococci or streptococci was inactivated, the bacterial suspension having the same concentration as the concentration of the desired antibody for vaccine, by admixing therewith 2-aminopyrimidine ethylmercurithiosalicylate at a concentration of 1/10,000.

In a modification, the bacterial suspension was heat treated at 56° C. for 30 minutes and then 2-aminopyrimidine ethylmercurithiosalicylate in a concentration of 1/50,000 was added.

Example 8

To preserve a serum, 2-aminopyrimidine ethymercurithiosalicylate was added in a concentration of 1/20,000.

What is claimed is:

1. 2-aminopyrimidine ethylmercurithiosalicylate.

2. A process for producing 2-aminopyrimidine ethylmercurithiosalicylate comprising reacting ethylmercurithiosalicylic acid with 2-aminopyrimidine in an alcohol solution, under reflux.

3. The process of claim 2 wherein the resulting 2-aminopyrimidine ethylmercurithiosalicylate is recrystalized in ethanol until stabilization of its melting point.

References Cited

UNITED STATES PATENTS 3,308,125    3/1967    Wakeman et al. _____ 260—242

HARRY I. MOATZ, Primary Examiner

U.S. Cl. X.R.

424—245

UNITED STATES PATENT OFFICE
CERTIFICATE OF CORRECTION

Patent No. 3,773,760　　　　　　　　Dated　November 20, 1973

Inventor(s)　Charles Pilet and Dominique Bocher

It is certified that error appears in the above-identified patent and that said Letters Patent are hereby corrected as shown below:

In The Heading:

"16,414" should read --71 16414--.

Signed and sealed this 18th day of June 1974.

(SEAL)
Attest:

EDWARD M. FLETCHER, JR.
Attesting Officer

C. MARSHALL DANN
Commissioner of Patents